UNITED STATES PATENT OFFICE.

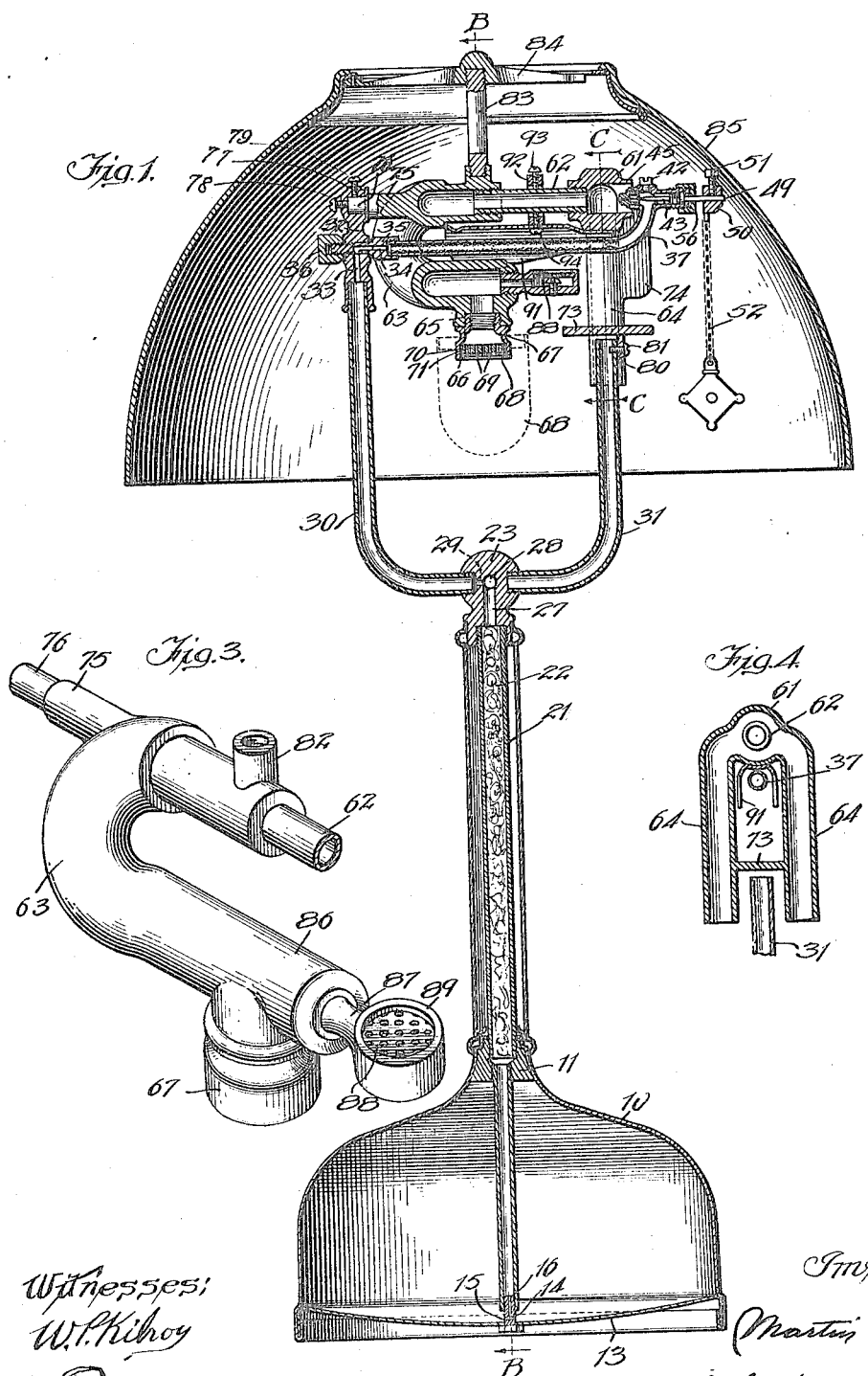

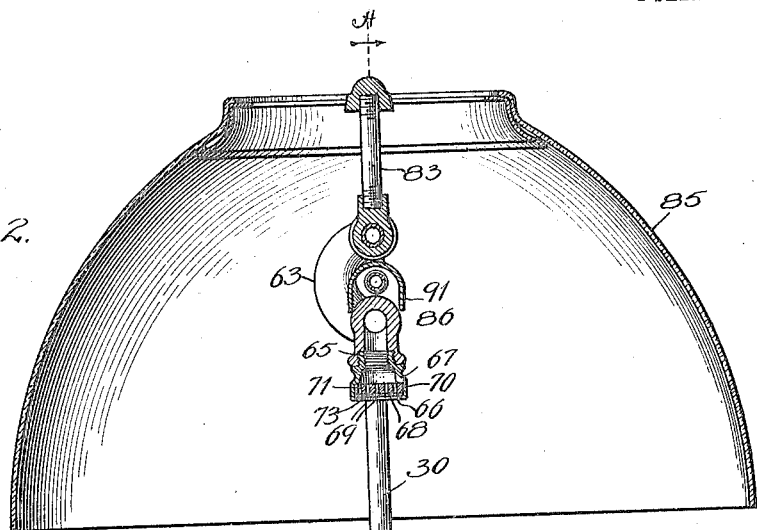
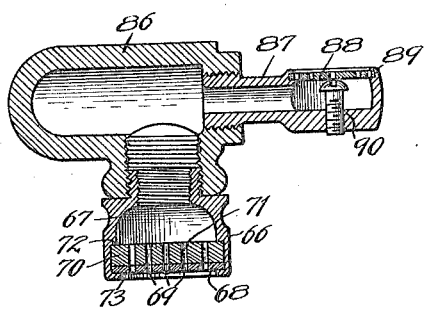
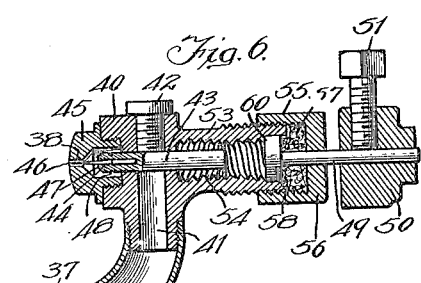
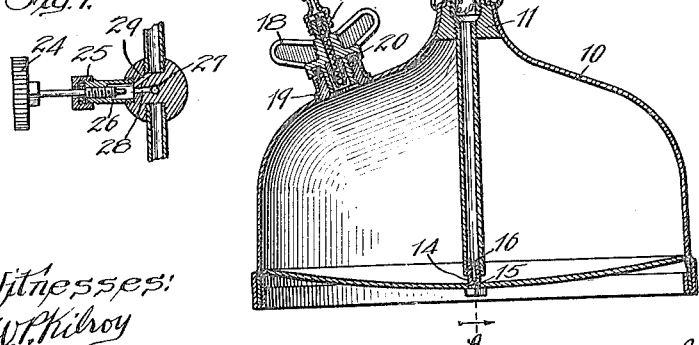

MARTIN ROCKSTED, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

HYDROCARBON-BURNER.

1,123,382. Specification of Letters Patent. Patented Jan. 5, 1915.

Application filed July 7, 1913. Serial No. 777,706.

*To all whom it may concern:*

Be it known that I, MARTIN ROCKSTED, a citizen of the United States, and a resident of Chicago, in the county of Cook and State of Illinois, have invented certain new and useful Improvements in Hydrocarbon-Burners, of which the following is a full, clear and exact specification.

My invention is concerned with hydrocarbon burners designed to generate gas from hydrocarbon oils, and more especially from kerosene, to be burned in an incandescent mantle for lighting purposes, and embodies certain novel combinations and features of construction to be hereinafter pointed out, by which I am enabled to vaporize kerosene so perfectly that the burner will operate for a long period of time with no other attention than supplying the oil thereto under pressure.

To illustrate my invention, I annex hereto two sheets of drawings, in which the same reference characters are used to designate identical parts in all the figures, of which,—

Figure 1 is a vertical section through a lamp embodying my invention, in section on the line A—A of Fig. 2; Fig. 2 is a vertical section on the line B—B of Fig. 1; Fig. 3 is a perspective view of the Bunsen tube; Fig. 4 is a detail in vertical section on the line C—C of Fig. 1; Fig. 5 is an enlarged view of a portion of the Bunsen tube and the burner head, as seen in Fig. 1, but on an enlarged scale; Fig. 6 is a similar view of the needle valve controlling the admission of the vapor to the Bunsen tube; and Fig. 7 is a detail in section on the line D—D of Fig. 2.

The kerosene to be vaporized is contained in a tank or font 10, which may be of any desired design, and is preferably constructed so as to furnish a substantial base for the complete lamp. In the upper portion thereof is secured a block 11, into which is threaded a tube 12 extending down substantially to the bottom 13 of the tank and covering the stud 14 passed up through the bottom of the tank. A horizontal passage 15 through the stud, opening into a vertical passage 16, permits the oil to rise through the tube 12. The oil is preferably kept under a considerable pressure, which will be necessary when the burner is above the tank, as indicated, and this pressure may be conveniently furnished by an air valve 17, like the ordinary inflating valve of a bicycle, which air valve is set in a screw-cap 18, which is threaded into the filling aperture 19 and, of course, will be provided with the customary packing ring 20 to make the closure air-tight.

Threaded into the upper end of the block 11, so as to form a continuous passage with the tube 12, is a tube 21 of considerably larger diameter, which tube I preferably fill with some flocculent filtering material, such as the cotton 22 illustrated. As the kerosene ascends through this cotton, any impurities therein are stopped and cannot reach the generator. Threaded onto the upper end of the tube 21 is a valve casing 23 for the stop cock 24, which preferably takes the form of a needle valve 25 threaded through a short tube 26, which is screwed into the side of the valve casing 23. The valve casing has a vertical passage 27 extending up to the center thereof, and the short horizontal passage 28 leading therefrom is adapted to be closed by the end of the needle valve 25. A passage 29 leads from the tube 26 through the valve casing to a tubular supporting-arm 30, which is preferably L-shaped in its general outline, and is threaded into one side of the valve casing 23. On the opposite side is a symmetrical arm 31, which might be solid, but which is shown as tubular, the two arms together serving as a support for the vapor-generating, burning and mantle-supporting apparatus.

The upper end of the tubular arm 30 has threaded thereon a connection 32, which has a vertical passage 33 therein adapted to coöperate with an L-shaped passage 34 in the member 35, which has a reduced portion terminating in a threaded end passed through a horizontal aperture in the connection 32. A cap 36 is screwed onto said threaded end, and the parts coöperate to form a readily adjusted joint, in the manner shown in Fig. 3 of my Patent No. 995,370. The generator tube 37 is threaded into the inner end of the member 35, and extends horizontally across and over the upper end of the arm 31, where said generator tube 37 is turned up, as best seen in Fig. 6, to support the vapor-discharging valve in proper position so that the nozzle or tip 38 will discharge a stream of vapor into the Bunsen tube, the upper portion of which is parallel to the body of the generator tube 37.

The generator tube 37 is provided with a wire gauze screen 39 therein to catch particles of solid carbon which might tend to be deposited in the generator tube, and to prevent them from reaching the nozzle 38. This gauze screen 39 is preferably formed of a sheet of comparatively coarse gauze extending substantially the entire length of the horizontal portion of the tube, and a much narrower sheet of relatively fine gauze, which two sheets are laid together and rolled up to form a tube having two thicknesses of the coarse gauze at one end and two thicknesses of the fine at the other end, with the two layers of gauze overlapping to form a connecting portion of four thicknesses. The portion of the thin gauze having two thicknesses is expanded, after the tube is rolled up, until its external diameter is substantially the internal diameter of the tube 37, so that the gauze fits therein snugly, as seen in Fig. 6. The end of the thin gauze is then folded over to form a closed end for the gauze-screen tube, so as to intercept the before mentioned particles of solid carbon.

The upturned end of the generator tube 37 has screwed therein a valve-casing 40, which has a vertical passage 41 leading therethrough, the upper end, however, being closed by a screw 42. A horizontal passage therethrough accommodates the brass rod 43 constituting the body of the needle valve, which portion terminates in a conical end 44 adapted to coöperate with a conical seat 45 on the interior of the nozzle 38, which nozzle or tip is screwed into the valve-casing 40, as will be readily seen. The fine aperture 46 in the nozzle is kept open by means of the steel needle 47, which will be seen to be tapered throughout its length and to be secured in the end of the brass rod 43 by indentations 48 formed in said rod and serving to press a portion of the material thereof into engagement with said steel needle tip. The construction of the needle tip here shown is adapted to accommodate itself readily to the aperture 46 to always keep the same clean and open. The valve stem 49 has attached thereto the customary arm 50, said arm being secured by a set screw 51, and provided with depending chains 52 by which the valve stem 49 may be swung through an arc of say ninety degrees to open and close the valve. This short rotation given to the valve stem necessitates unusual means for opening the valve, and for this purpose I provide in the arm 53 of the valve casing 40 the internal quick thread 54, with which coöperates the quick-thread screw 55 secured on the rod 53. The packing gland 56 is screwed onto the externally threaded end of the arm 53, and the packing 57 is placed in the gland. To keep the packing out of the screw threads and to limit the outward movement of the screw when the valve is opened, I provide the disk 58 through which the valve stem 49 passes, and which is seated against a shoulder 60 formed in the outer end of the arm 53.

Vapor passing from the nozzle 38 is discharged into the mixing end of the Bunsen tube, which is shown as conveniently formed of three pieces, a casting 61, a short tube 62 having one end threaded into the casting 61 and the other end threaded into the generally U-shaped extension 63, which is best shown in Fig. 3. The casting 61 has a central cylindrical portion having a passage therethrough for the vapor into the tube 62, while, extending downwardly from either side of this central cylindrical portion, is a tubular extension 64, the two extensions and the central portion forming a tube of substantially inverted U-shape. The tubes 64 supply the air for the mixture, which air ascends through the tubes and is carried by the jet of gas into the tube 62 and the interior of the casting 63. The bottom of the casting 63 is provided with a boss 65, into which is threaded the burner-head 66, which preferably has an annular groove 67 therein by which the rag mantle 68, indicated in dotted lines in Fig. 1, is tied in place on the burner-head. I preferably close the burner-head with a thin disk 68 of German silver, or some similar metal refractory to heat, in which apertures 69 may be readily punched. The thin disk 68 does not furnish sufficient body to properly stand the heat of the jets of gas which are ignited as they emerge from the apertures 69, and consequently I back the disk 68 up by a much thicker disk 70, which may be of brass, like the head 66, and in which apertures 71 are drilled in register with the apertures 69. The disks are held in place in any desired manner, as by being held against the annular shoulder 72 on the interior of the burner by the turned over flange 73 formed on the bottom thereof.

It will be noted that the lower ends of the air-supplying tubes 64 extend below the plane of the bottom of the burner head, and this is an essential feature, as if the ends of these tubes 64 terminated materially above the burner head, or even on substantially the same level, the tendency would be for the gas, when the supply is shut off, to escape from the ends of the tubes 64 unconsumed. With the burner head terminating above the ends of the tubes 64, the tendency is for the air to be drawn through the tubes 64, so that the gas which remains in the mechanism after the valve 43 is closed is all consumed at the burner head, and there is no escape of the ill-smelling unconsumed vapor into the rear when the valve is closed. I preferably form between the arms 64 the plate-like connection 73, which is conveniently adapted to have an igniting torch, such as is shown in my application No. 777,707, filed July 7, 1913, placed thereon. To keep the flame of the torch on the generator tube 37, I preferably form on the outer edges of the tubes 64, vertical flanges 74, which are so located as to direct the flame of the torch onto the generator tube 37.

The casting 63 has an arm 75 provided with a reduced portion 76 adapted to enter an aperture 77 in the upper end of the connection 32, and to hold the casting in place, I pass a screw 78 through a small aperture in the connection 32 opening into the aperture 77, and thread said screw 78 into the end of the portion 76. A set screw 79 threaded through the top of the connection 32 and engaging the end 76 of the casting 63 also serves to assist in securing the casting 63 in place. The flange 73 is provided with an outwardly extending lug 80 on its under side, through which a screw 81 is passed and threaded into the upper end of the pipe or rod 31, thus supporting the other end of the burner, both ends being thus supported by the U-shaped yoke formed by the two arms 30 and 31. Into the lug 82 formed on the upper end of the casting 63, I screw a short rod 83, and the upper end of said rod is screwed into a spider 84, the annular periphery of which is suitably shaped to receive and support the top of a shade 85, which is adapted to cover and protect the lamp, while at the same time having an ornamental effect thereon. It will be understood, of course, that the casting 63 has a channel therethrough for the mixture of air and vapor to pass in reaching the burner head 66, and the U-shaped portion 86 of said casting is deflected to one side, as it were, so that the generator tube 37 may pass the same and lie in a position directly between the two horizontal parallel portions of said casting. In the extreme outer end of the lower horizontal portion or arm 86 of the casting 63, I screw the superheater burner 87, which will be seen to consist of a neck portion and a cupped head, in the upper portion of which is set a perforated disk 88, preferably constructed of German silver or some other flame-resisting metal. The flange 89 on the head of the burner surrounding this disk is preferably extended up above the disk a little distance, as shown, in order to protect the flame from being blown out by a draft across the burner. I have found by experience that a comparatively small flange 89 will effect this result, whereas the entire omission of such a flange leaves a structure in which the flange is very readily blown out. I have also found that a spreader is essential in this superheater burner, as otherwise the flame tends to be blown by the pressure of the gas out to a point at the outer end of the burner, and the concentration of the flame at this point soon burns out the generator. A convenient form of spreader consists of a screw 90 screwed into the center of the bottom of the head of the superheater burner, with the head of the screw directly beneath the perforated disk 88. With this construction, the flow of the gas is interrupted so that it will rise uniformly through all the apertures and make the flame spread over the desired area, so as to prevent undue burning of the generator tube 37. To assist in confining the flame from this superheater burner to the generating tube 37, I preferably employ a metallic shield 91, which is U-shaped in its general cross-section and which is supported beneath the tube 62 by a ring 92 secured on the tube 62 by a set screw 93, the shield 91 being secured to the bottom of the ring 92 by a set screw 94 passed through the shield and into the ring. The general shape of the shield is shown in Fig. 1, where half of the shield is seen, and the other symmetrical half is, of course, of the same shape.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, a burner head having a thin perforated plate of German silver forming the gauze, and a correspondingly perforated thicker disk of brass forming a backing for the gauze.

2. In a device of the class described, the combination with a tank, of a pair of widely separated arms forming a U-shaped support above the tank, one of said arms being hollow and operatively connected with the tank, and vapor generating and burning and mantle-supporting apparatus extending transversely of and supported at the upper ends of said arms and operatively connected with the tubular one, said vapor generating and burning and mantle-supporting apparatus including a sub-flame burner coöperating with the vapor-generating apparatus to heat the same to the vapor-generating point, and said apparatus being detachable from said arms without disassembling the rest of the device.

3. In a device of the class described, the combination with a tank, of a pair of arms forming a U-shaped support above the tank, one of said arms being hollow and operatively connected with the tank, and vapor generating and burning and mantle-supporting apparatus supported at the upper ends of said arms and operatively connected with the tubular one, said apparatus comprising a horizontal generator-tube connected at one end to the hollow arm and at the other end provided with a tip, a Bunsen tube having a portion thereof parallel to the generator and above the same, with another portion below the same, and a third U-shaped portion connecting the two aforesaid portions, said tip discharging into the upper portion of the Bunsen tube, and a burner-head extending down from the lower portion between the arms.

4. In a device of the class described, the combination with a tank, of a pair of arms forming a U-shaped support above the tank, one of said arms being hollow and operatively connected with the tank, and vapor generating and burning and mantle-supporting apparatus supported at the upper ends of said arms and operatively connected with the tubular one, said apparatus comprising a horizontal generator-tube connected at one end to the hollow arm and at the other end provided with a tip, a Bunsen tube having a portion thereof parallel to the generator and above the same, with another portion below the same, and a third U-shaped portion connecting the two aforesaid portions, said tip discharging into the upper portion of the Bunsen tube, a burner-head extending down from the lower portion between the arms, and a superheater connected with the lower portion of the Bunsen tube to direct a flame on the generator.

5. In a device of the class described, the combination with a generator tube, of a wire gauze screen therein to receive carbon deposits thereon, said screen consisting of a roll of coarse gauze having a roll of finer gauze forming a tip therefor toward the discharge end.

6. In a device of the class described, the combination with a generator tube, of a wire gauze screen therein to receive carbon deposits thereon, said screen consisting of a roll of coarse gauze having a roll of finer gauze forming a tip therefor toward the discharge end, said finer gauze being rolled into the coarser gauze, then expanded to fill the tube, and finally having its ends folded over to close the same.

7. In a device of the class described, the combination with a generator-tube having a nozzle adapted to discharge a stream of vapor parallel thereto, of a Bunsen tube having a portion thereof on one side of the generator-tube and parallel thereto and another portion on the other side thereof, a U-shaped portion connecting the two portions and passing around the generator-tube, and a burner-head connected to the portion of the Bunsen tube farthest from the nozzle and extending radially from the axis thereof.

8. In a device of the class described, the combination with a generator-tube having a nozzle adapted to discharge a stream of vapor parallel thereto, of a Bunsen tube having a portion thereof on one side of the generator-tube and parallel thereto, another portion on the other side thereof, and a U-shaped portion connecting the two portions and passing around the generator-tube, a burner-head connected to the Bunsen tube and extending away from the generator, and a superheater-burner connected thereto near the burner-head and directing its flame upon the generator-tube.

9. The combination with a horizontal generator-tube having a nozzle adapted to discharge a stream of vapor parallel thereto and above the same, of a Bunsen tube having a portion thereof above the generator-tube and parallel thereto, into which the nozzle discharges, another portion on the under side of the generator-tube, and a U-shaped portion connecting the two portions and passing around the generator-tube, a burner-head connected to the lower portion of the Bunsen tube and extending downward therefrom, and a super-heater burner connected to the end of said lower portion and directing its flame upward upon the generator-tube.

10. The combination with a generally U-shaped Bunsen tube, of a generator-tube extending between the sides of the U, a burner-head connected to and projecting away from the U, and a superheater adjacent the burner-head and directing its flame onto the generator-tube and entirely away from the burner-head.

11. In a device of the class described, the combination with a generator, of a Bunsen tube into which the generator discharges, a burner-head directed away from the generator, and a superheater-burner directed toward the generator, and having a spreader therein acting on the gas only and not in contact with the flame, for the purpose described.

12. In a device of the class described, the combination with a generator, of a Bunsen tube into which the generator discharges, a burner-head directed away from the generator, and a superheater-burner having a perforated plate directed toward the generator, and having a spreader therein, for the purpose described, consisting of a screw threaded into the center of the burner just beneath its perforated plate.

13. In a device of the class described, the combination with a single generator, of a single Bunsen tube into which the generator discharges, a burner-head connected to the Bunsen tube directed away from the generator, and a superheater burner having a perforated plate likewise connected to the Bunsen tube and directed toward the generator, said superheater burner having a flange extending slightly above the perforated plate to prevent the flame being accidentally extinguished, for the purpose described.

14. In a device of the class described, the combination with a U-shaped Bunsen tube, of a generator-tube lying between the arms thereof and having its nozzle discharging into one arm thereof, a burner-head connected to the Bunsen tube directed away from the generator, a superheater-burner connected to the Bunsen tube and directed toward the generator-tube, and a hood between the generator and other arm of the Bunsen tube directing the flame from the superheater-burner on the generator-tube.

15. In a device of the class described, the combination with a generator, of a Bunsen tube connected therewith, a burner-head extending downwardly therefrom, and a pair of air-supplying tubes for the Bunsen tube extending below the level of the burner-head, said pair of tubes being provided with vertical flanges to hold the torch-flame on the generator tube which passes between the air-supplying tubes.

16. In a device of the class described, the combination with a generator, of a Bunsen tube connected therewith, a burner-head extending downwardly therefrom, a pair of air-supplying tubes for the Bunsen tube extending below the level of the burner-head, and a flat connecting flange between the air-supplying tubes, for the purpose described.

17. In a device of the class described, the combination with a generator, of a Bunsen tube connected therewith, a burner-head extending downwardly therefrom, a pair of air-supplying tubes for the Bunsen tube extending below the level of the burner-head, a flat connecting flange between the air-supplying tubes, for the purpose described, and vertical flanges on the air-supplying tubes to hold the flame of the torch resting on the flange on the generator-tube which passes between the air-supplying tubes.

18. In a device of the class described, the combination with a tank, of a pair of arms extending above the same, one of said arms being tubular and connected with the tank to supply oil to the burner, a Bunsen tube extending transversely across the top of the two arms and supported thereby, and a generator-tube also supported above and by said pair of arms and operatively connected with the tubular arm and discharging through a nozzle into the Bunsen tube, said generator tube being removable without disassembling the remainder of the structure.

19. In a device of the class described, the combination with a tank, of a pair of arms extending above the same, one of said arms being tubular and connected with the tank to supply oil to the burner, a generally U-shaped Bunsen tube extending transversely across the tops of the two arms and supported thereby, and a generator-tube between the two arms of the Bunsen tube and having one end curved up to discharge the vapor into the upper arm of the Bunsen tube, the other end of the generator-tube being supported by and operatively connected to the tubular arm.

20. In a device of the class described, the combination with a tank, of a pair of arms extending above the same, one of said arms being tubular and connected with the tank to supply oil to the burner, a generally U-shaped Bunsen tube extending transversely across the tops of the two arms and supported thereby, a generator-tube between the two arms of the Bunsen tube and having one end curved up to discharge the vapor into the upper arm of the Bunsen tube, the other end of the generator-tube being supported by and operatively connected to the tubular arm, a downwardly directed burner-head extending from the arm of the Bunsen tube, and a superheater burner extending from the lower end of said lower arm and directing its flame on the generator-tube.

21. In a device of the class described, the combination with a tank, of a pair of arms extending above the same, one of said arms being tubular and connected with the tank to supply oil to the burner, a generally U-shaped Bunsen tube extending transversely across the tops of the two arms and supported thereby, a generator-tube between the two arms of the Bunsen tube and having one end curved up to discharge the vapor into the upper arm of the Bunsen tube, the other end of the generator-tube being supported by and operatively connected to the tubular arm, a downwardly directed burner-head extending from the lower arm of the Bunsen tube, a superheater-burner extending from the end of said lower arm and directing its flame on the generator-tube, and an air-supplying tube connected to the Bunsen tube and extending down below the burner-head and connected to one of the supporting arms.

22. In a device of the class described, the combination with a tank, of a pair of arms extending above the same, one of said arms being tubular and connected with the tank to supply oil to the burner, a generally U-shaped Bunsen tube extending transversely across the tops of the two arms and supported thereby, a generator-tube between the two arms of the Bunsen tube and having one end curved up to discharge the vapor into the upper arm of the Bunsen tube, the other end of the generator-tube being supported by and operatively connected to the tubular arm, a downwardly directed burner-head extending from the lower arm of the Bunsen tube, a superheater-burner extending from the end of said lower arm and directing its flame on the generator-tube, a pair of air-supplying tubes for the Bunsen tube extending down below the burner-head and connected to one of the supporting arms, and a horizontal flange between said tubes, said flange constituting the means of connection of the air-supplying tube to the supporting arm.

23. In a device of the class described, the combination with a tank, of a pair of arms extending above the same, one of said arms being tubular and connected with the tank to supply oil to the burner, a generally U-shaped Bunsen tube extending transversely across the tops of the two arms and supported thereby, a generator-tube between the two arms of the Bunsen tube and having one end curved up to discharge the vapor into the upper arm of the Bunsen tube, the other end of the generator-tube being supported by and operatively connected to the tubular arm, a downwardly directed burner-head extending from the lower arm of the Bunsen tube, a superheater-burner extending from the end of said lower arm and directing its flame on the generator-tube, a pair of air-supplying tubes for the Bunsen tube extending down below the burner-head and connected to one of the supporting arms, a horizontal flange between said tubes, said flange constituting the means of connection of the air-supplying tube to the supporting arm, and vertical flanges on the air-supplying tubes adapted to direct the flame from a torch onto the generator-tube.

In witness whereof, I have hereunto set my hand and affixed my seal, this 22nd day of May, A. D. 1913.

MARTIN ROCKSTED. [L. S.]

Witnesses:
JOHN HOWARD McELROY,
MILDRED ELSNER.

Copies of this patent may be obtained for five cents each, by addressing the "Commissioner of Patents. Washington, D. C."